June 24, 1930.                D. H. JONES                1,765,491
EGG OPENER
Filed Jan. 16, 1929
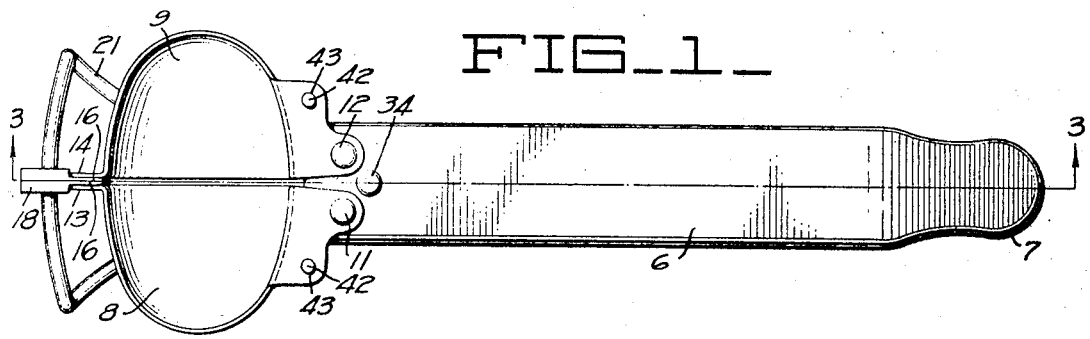
FIG_1_
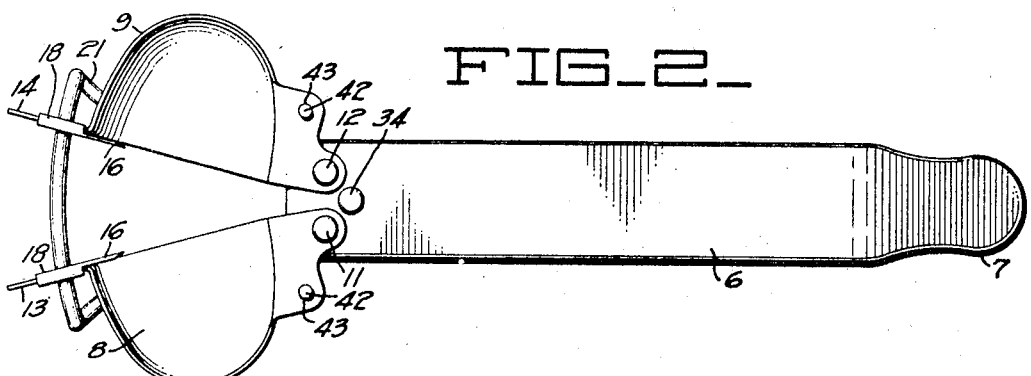
FIG_2_
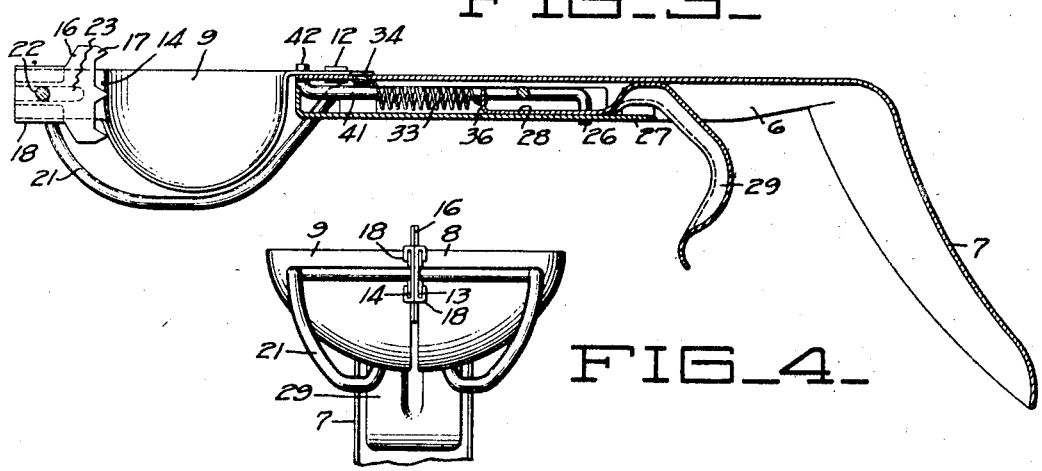
FIG_3_
FIG_4_
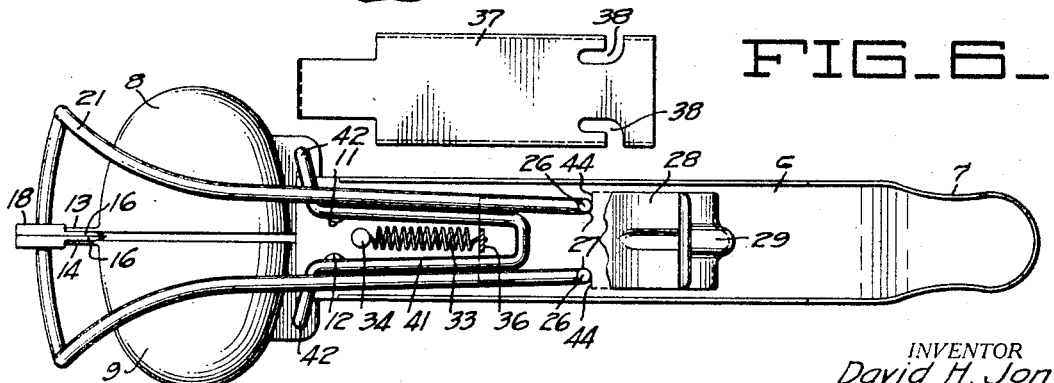
FIG_6_
FIG_5_
INVENTOR
David H. Jones
BY
White, Prost & Fryer
ATTORNEYS Patented June 24, 1930

1,765,491

UNITED STATES PATENT OFFICE

DAVID H. JONES, OF SODA SPRINGS, CALIFORNIA

EGG OPENER

Application filed January 16, 1929. Serial No. 332,820.

The device of my invention relates to a means for opening eggs and similar articles. One of the principal objects of the invention is to provide a device of this character which is effective to open and separate the respective portions of an egg.

Another object of this invention is to provide an effective egg opening device of simple, inexpensive but rugged structure, sanitary and reliable in operation.

A further object of this invention is to provide a device which is easily operated to efficiently open eggs.

The invention possesses other advantageous features, some of which with the foregoing, will be set forth at length in the following description, where I shall outline in full that form of my invention which I selected for illustration in the drawing accompanying and forming part of the present specification. In said drawing, I have shown one type of egg opener embodying my invention but it is to be understood that I do not limit myself to such type, since the invention, as set forth in the claims, may be embodied in a plurality of forms.

In the drawings:

Figure 1 is a plan view of the device of my invention.

Figure 2 is a plan view of the device of my invention showing the sections of the egg receptacle in open position.

Figure 3 is a section through the device of my invention along the line 3—3 of Figure 1.

Figure 4 is an end view of the device of my invention which is shown sectionally in Figure 3.

Figure 5 is a plan view of the under side of my invention with the bottom cover plate of the handle removed.

Figure 6 is a plan view of the bottom cover plate of the handle.

In the preferred form of the device of my invention, as shown in the drawing I conveniently provide a handle 6 and, at one end thereof, a grip portion 7 which is suitably formed to permit retention in the hand of an operator. At the other end of the handle I provide means for receiving and holding an egg which, expeditiously, is formed of the two separable, ellipsoidal receptacles 8 and 9. These receptacles are pivotally mounted on the handle 6 by means of the pins 11 and 12.

The receptacles 8 and 9 are each provided preferably with rectangularly shaped extensions 13 and 14 which, as shown more particularly in Figures 2, 3 and 4, are adapted to receive thereon egg cutting knives 16. As shown in Figure 4, each knife, which is preferably formed with several sharp projecting teeth 17, is provided, preferably, with the several grooved portions 18. These render the knife movable on the rectangular extension of the receptacle and yet retain it in position. The several groove portions 18 are conveniently formed by bending over portions of the knife.

To actuate the knives for the cutting of an egg shell means are conveniently provided in the wire loop 21 which is suitably placed in operative contact with each knife. Thus I provide a hole 22 in each knife and a slot 23 in each of the receptacle extensions thru which the loop is passed. Movement of the loop, within the limits permitted by the extensions, moves the knives into or out of the peripheral portion of the egg receptacle. Movement of the loop is accomplished, usually, by having the ends thereof disposed within the handle 6 and the extreme end portions suitably formed to be received by some means of actuation. Thus the ends 26 are bent over and received within the grooves 27 in the plate 28 which is likewise disposed within the handle. I usually form the trigger 29 integrally with the plate 28 to simplify the structure.

As means for returning the egg opening device from its extreme open position, as will be later disclosed, I preferably provide a spring 33 suitably attached to the handle by a pin 34 and to a bent portion 36 of the actuator plate 28.

To retain the various operating mechanisms in their proper relationships within the handle, and for other reasons, I provide the bottom cover plate 37, shown in Figure 6, which is suitably adapted to be retained in its desired position upon the handle. For limiting the cutting travel of the knives I preferably provide the generally outwardly extending grooves 38 within which the ends of the knife operating loop are disposed. Movement of the plate 28, with which the ends of the loop are in contact, causes the loop ends first to travel along the grooves 38 in substantially parallel paths. Continued travel brings them in contact with the outwardly extending portions of the grooves 38 and the loop ends are finally released from active contact with the actuator plate. The trigger and plate are then further depressed without actuating the loop 21.

To separate the egg after it has been cut I usually provide the loop 41 the ends 42 of which are pivotally retained in the respective portions of the egg receptacle by means of the holes 43. These are so disposed that movement of the loop will cause the portions of the egg receptacle to move pivotally on the handle. To move the loop I conveniently provide that the bent portion 36 of the trigger structure shall be sufficiently long and so positioned with respect to the loop that it will engage the loop when the cutting knives have completed their cutting operation.

In operating the opener, an egg is placed in the egg receptacle which normally has the position shown in Figure 1. Depression of the trigger first moves the knives into the peripheral portion of the receptacle and so into the egg. It has been my experience that with the device of my invention, which has been described in its preferred form, the egg is not shattered, as is usual with other devices of this character, but is generally neatly severed across substantially the minor axis of the egg. This facilitates the discharge of the egg contents from the egg shell free from any broken pieces thereof and also expedites the removal of the severed shell from the device. Continued depression of the trigger causes the ends of the loop to travel outwardly in the grooves in the bottom plate thus disengaging the loop from the actuating plate and discontinuing the cutting travel of the knives. At this point the bent portion of the trigger engages the receptacle separating loop and, upon further depression the portions of the receptacle, together with their respective knife blades, are separated—as shown in Figure 2—thus materially opening the egg and allowing the discharge of its contents.

The portions of the egg shell are then removed; the release of the pressure upon the trigger allows the spring to exert its force and return the several mechanisms to their normal positions. Thus the actuator plate 28 is returned to its normal position and, in so returning, the shoulders 44 formed upon the plate engage the loop ends, which are in the outer portion of the grooves 38, and cause their return from their inactive position to positive engagement with the grooves 27 in the plate 28. The pressure on the loop 41 is also released, the receptacles 8 and 9 returning to their normal closed position, as shown in Figure 1. The broken portions of the egg may then be readily removed from the egg receptacles.

I claim:

1. An egg opener comprising a handle, an egg receptacle divided into sections, said sections being pivotally mounted on said handle, egg cutting knives cooperatively mounted on said sectional receptacles, a trigger mounted on said handle, a lip formed at one end of said trigger, a wire loop cooperatively attached to said trigger and to said knives, said handle having outwardly extending grooves wherein portions of said wire loop are passable to remove said loop from cooperative contact with said trigger, a second wire loop eccentrically positioned with respect to said sectional receptacle said second loop being engaged by said trigger lip upon depression of said trigger to move said receptacles pivotally, and a spring attached to said handle and to said trigger lip.

2. An egg opener comprising a handle, a trigger on said handle, an egg receptacle divided into sections, said sections being pivotally mounted on said handle, a knife on each of said sections, a wire loop connected to said knives and to said handle, said loop being adapted to be engaged by said trigger and to move said knives into the peripheral portions of said sections upon actuation of said trigger, means on said handle for disengaging said loop from said trigger, a second wire loop connected to said sections and overlying said handle, said loop being adapted to be engaged by said trigger upon further actuation of said trigger thereby pivoting said sections about said handle, and means connected to said handle and to said trigger for disengaging said last named loop from said trigger upon release of said trigger.

In testimony whereof, I have hereunto set my hand.

DAVID H. JONES.